Dec. 21, 1965  S. J. STRONG ETAL  3,225,206
PHOTOSENSITIVE INSPECTION APPARATUS FOR FILAMENTARY MATERIAL
Filed March 14, 1962  2 Sheets-Sheet 1
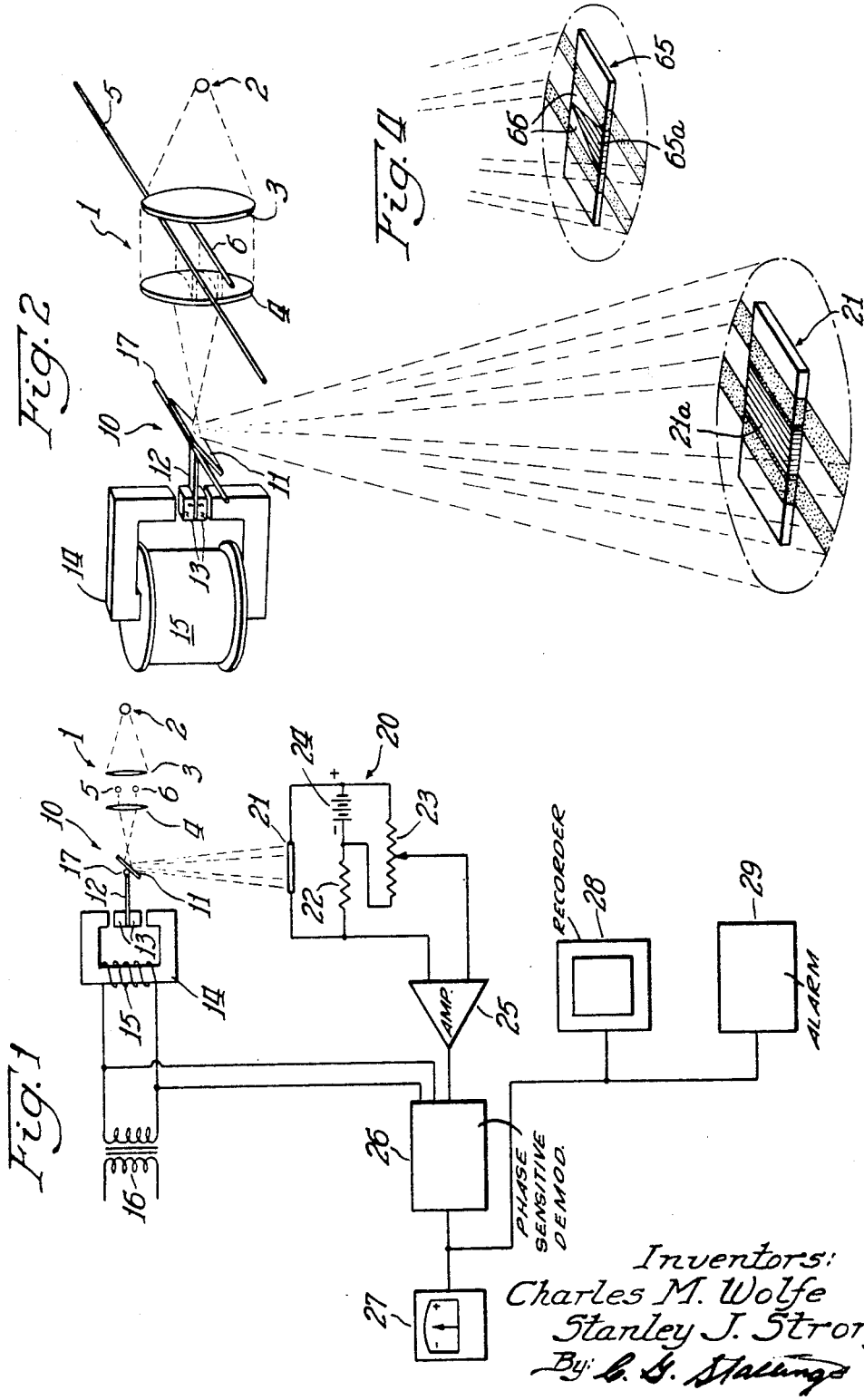
Inventors:
Charles M. Wolfe and
Stanley J. Strong
By C. G. Stallings Atty.

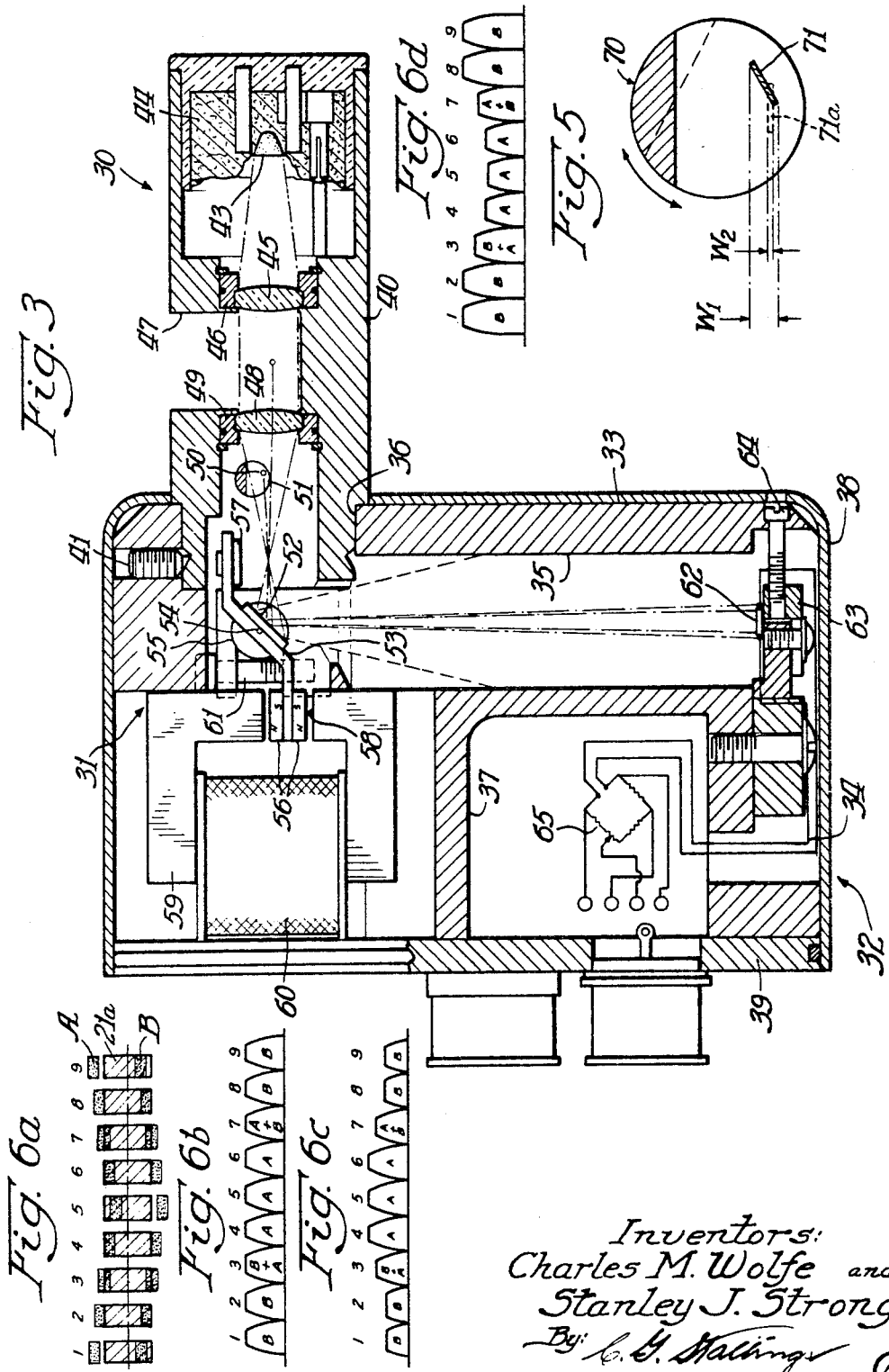

United States Patent Office 3,225,206
Patented Dec. 21, 1965

1

3,225,206
PHOTOSENSITIVE INSPECTION APPARATUS FOR FILAMENTARY MATERIAL
Stanley J. Strong, Pomona, and Charles M. Wolfe, Glendora, Calif., assignors to Borg-Warner Corporation, Chicago, Ill., a corporation of Illinois
Filed Mar. 14, 1962, Ser. No. 179,730
2 Claims. (Cl. 250—219)

This invention relates to a filamentary material inspection apparatus capable of measuring the diameter of such material and detecting the presence or absence of continuous running lengths moving through the apparatus.

This invention is also concerned with a filamentary material inspection apparatus utilizing means for continuously comparing the characteristics of the filamentary material undergoing inspection with a reference standard of known characteristics.

This invention is more particularly concerned with a filamentary material inspection apparatus incorporating a novel principle of operation, said principle utilizing an oscillating shadow image of the filamentary material in an infrared beam.

Filamentary material, as the term is used in this specification, is meant to include all materials generally opaque with respect to the particular radiation employed and having a substantially circular cross-section. Thus it is within the scope of the term to include filaments, fibers, threads, cords, strands, wires, rods, and all similar materials. Since the textile industry is particularly concerned with threads, or bundles of individual filaments, the term threadline will occasionally be used for convenience but is not to be specially limited thereto. Also, while the invention is particularly suited for the continuous monitoring or inspection of running lengths of filamentary material it should be clear that the invention could be employed to inspect stationary material on a spot check basis.

The textile industry has long felt a need for a device which will detect the presence or absence of a threadline as it is fed, for example, to a loom or knitting machine. Many such threadlines are required and if one of them breaks, a defect shows up in the woven or knitted material which must be subsequently repaired.

A further requirement is a device which will continuously monitor and record the diameter of the threadlines. Threads are classed according to denier, the weight in grams of 9,000 meters of such thread. A common fine thread may comprise 13 filaments and have a denier of 24 while a common dress goods thread involves approximately 25 filaments with a denier of 70. Thread for draperies and carpeting may run as high as 300 filaments with a denier on the order of 1,200. It should be obvious that if the density of the material remains constant and it has a generally regular circular cross-section, the denier may be ascertained by measuring the diameter of the threadline. One of the problems involved in measuring the material without physically contacting the same is that the material is subject to continuous vibration under tension at high speeds. This problem will be discussed below.

The present invention has numerous advantages over known prior art devices intended to be used for the same general purposes, which advantages may be summarized as follows:

I. *Flexibility.*—It can be adapted to be employed in many diverse applications particularly in the simultaneous monitoring of large numbers of filaments and threadlines. Since it is adapted to miniaturization, it can easily accommodate multiple threadlines, with each unit monitoring an individual thread and all being connected to a common alarm and/or recording and/or feed interlock system for discontinuing feed of the threadlines in the event of a break or serious defect.

II. *Accuracy.*—The unit is extremely accurate and capable of precisely measuring the diameter of filamentary material on the order of 0.0004 inch running at linear velocities as high as 10,000 feet per minute. A novel principle of operation reduces errors due to temperature change, stray light conditions, aging of electronic components, and filament vibration, to an absolute minimum.

III. *Simplicity.*—Without sacraficing the inherent accuracy of the present instrument, it may be manufactured and maintained at low cost. Having only a single moving part and elementary electrical circuitry which the unsophisticated mechanic could repair if necessary, the unit is ruggedly constructed for long, trouble-free life.

The principle of operation may be succinctly stated as follows: A collimated beam of radiation, preferably in the infrered range, is focused onto an oscillating reflective surface which reflects the beam onto a photosensitive cell; a running length of filamentary material is then led into the collimated beam between the source of radiation and the reflective surface forming a show image of itself; a reference shadow image, parallel to and spaced from the filament shadow image, is formed by a reference element in the beam; the system is so adjusted that the two shadow images are alternately and cyclically projected by the reflective surface onto the photosensitive cell, the output of the cell producing an A.C. signal proportional to the difference between the widths of the respective shadow images.

It is therefore an object of the present invention to provide a filamentary material inspection and gaging apparatus.

It is another object to provide an apparatus for inspecting and gaging filamentary material which incorporates a novel system for continuously comparing the filament characteristics with a standard or reference.

Other objects and features of the invention will be readily apparent to those skilled in the art from the detailed description and appended drawings illustrating a preferred embodiment in which:

FIGURE 1 is a schematic drawing illustrating the basic elements and electrical circuitry in diagrammatic form;

FIGURE 2 is an isometric drawing showing the basic mechanical elements of the system;

FIGURE 3 is a cross-sectional view, partly schematic, of a preferred embodiment of the invention constructed in accordance with the principles illustrated in FIGURES 1 and 2;

FIGURE 4 is an isometric drawing illustrating an alternative form of the detector cell;

FIGURE 5 is a detailed cross-sectional view of an alternative form of the reference element and its support means; and FIGURES 6a, 6b, 6c, and 6d illustrate the relationship between the position of the respective shadow images on the detector and the output waveform under various conditions.

Referring now to FIGURES 1 and 2, there is illustrated, in schematic form, the general principles and basic elements of the present invention. The inspection device includes three basic elements: (I) the optical image forming means; (II) the oscillatory reflector means; and (III) the detector means. The image forming means designated in general by the numeral 1 comprises a source of radiation 2, which in the case of the preferred infrared system is a small heater, a collimating lens 3, and a focusing lens 4. A running length of filamentary material 5 is drawn between the collimating lens and the focusing lens thereby creating a shadow image of itself, the width of which is directly proportional to the diameter of the filament.

A reference element 6, which may be a wire, ribbon or similar material, is similarly positioned in the beam of radiation parallel to and spaced from the filament 5, thereby creating a shadow image of itself spaced from and parallel to the shadow image of the filament. The location of the stationary reference element 6 may be anywhere along the length of the beam but is preferably either between the lenses 3 and 4 or between the focusing lens 4 and the mirror 11. Certain advantages are obtained by locating the reference element in the latter position which will be explained below. Also, an advantage of employing a collimated beam is that movement and vibrations parallel to the axis of the beam do not alter the width or position of the shadow image.

The oscillatory reflector means 10 comprises means forming a reflective surface 11, preferably a silvered mirror, which is mounted on a torsion wire 17 rigidly suspended between a pair of stationary members (not shown). An oscillatory drive system is operatively associated with the mirror 11, said drive system comprising a generally C-shaped core element 14 surrounded by coil 15, and an armature including opposed permanent magnets 13, 13 and armature bar 12 connected to the mirror. A.C. power from transformer 16 is transmitted to the coil 15 and drives the armature and mirror assembly at any desired frequency, preferably from about 10 to 60 cycles per second.

Detector means 20 includes a photosensitive cell 21 having a sensitized area 21a positioned in a path to intercept reflected radiation from the mirror 11. In the case of the infrared system, the cell 21 may be a PbS cell. PbS detectors are well known in the industry and may be obtained in various sizes and have different degrees of sensitivity, thus offering the designer a wide degree of flexibility. A PbS cell is in the class of photoconductors, that is it conducts current as a function of the quantity of radiation received. Conversely, it may be regarded as a variable resistor, the value of resistance being inversely proportional to the amount of radiation received. The PbS detector cell is in combination with a conventional bridge circuit including fixed resistance 22, variable resistance 23, and a constant voltage source 24. The A.C. output signal of the bridge circuit is transmitted to a conventional amplifier 25, and the amplified A.C. signal is in turn transmitted to a phase sensitive demodulator 26 having a D.C. output for transmission to the recording and alarm system. The demodulator and mirror drive coil are to be connected to and fed from the same source. For illustrative purposes the D.C. output of the phase sensitive demodulator is shown as being transmitted to a meter 27, a recorder 28, and visual or audible alarm 29. The recording and alarm system forms no part of the present invention since the output of the cell can be employed in any number of ways well known to those skilled in the art.

*Operation of the detector means*

As best shown in FIGURE 2, the spaced parallel shadow images of the filament and reference wire are reflected from the mirror onto the PbS cell 21. The cell is adjusted to a position so that when the mirror is at its intermediate position between cycles, referred to as the zero-point, the shadow images fall on both sides of the sensitized area 21a of the cell so that a portion of each shadow is on the cell at this point. As the mirror is oscillated, each shadow image is alternately and cyclically projected onto the sensitized area of the cell. If a constant voltage is placed across the cell, it should be obvious that the current flow through the cell is a function of the area covered by the shadow images at any time in the cycle. If one shadow image is wider than the other, then the result will be a varying D.C. current which may be utilized as an A.C. signal by proper biasing and amplified as such. Since the cell 21 is in a bridge circuit, a variation of the conductivity (resistance) across the cell will cause an A.C. voltage output across the bridge if it has been initially balanced to null by adjustment of variable resistor 23.

To facilitate an understanding of the system, attention is directed to FIGURES 6a, 6b, 6c, and 6d which diagrammatically represent the relationship of the respective shadow positions on the cell to the cell output. In FIGURE 6a, the shadow of the reference element is represented by A and the shadow of the filament by B in various positions during the oscillatory cycle. In positions 3, for example, a portion of both A and B are on the cell 21a so that area covered is substantially constant at all times when the widths of A and B are equal. The electronic counterpart is illustrated in FIGURES 6b, 6c, and 6d which wave patterns could be obtained by measuring the total voltage across the system. If the widths of A and B are approximately equal, a waveform corresponding to FIGURE 6b is obtained, with the peaks of adjacent waves being equal. If the filament being measured becomes smaller in size the shadow imposed on the cell is smaller, causing a decreas in voltage and lowering the output, thereby changing the overall waveform as shown in FIGURE 6c. Likewise, if the filament becomes larger, the shadow will become greater and an increase in voltage will occur as illustrated in FIGURE 6d and an overall waveform will change in the reverse phase.

In effect then, the detector senses the variation in the difference between the widths of the respective shadow images which are in turn directly proportional to the difference between their respective diameters. In the event the filament or thread is not present when a reference is used, the signal output will be full scale. If a reference is not used, the signal output would be zero; and such value may be taken as an indication of a break in the line.

Having thus far described the general elements of the present invention, these elements are incorporated in a preferred embodiment shown in FIGURE 3, which comprises an optical shadow image forming means 30, an oscillatory reflector means 31, and a detector means 32.

The unit is built around a frame member 33 having a base portion 34, a front plate portion 35 having an aperture 36 adapted to accommodate the optical image forming means, and a housing 37 adapted to encase the bridge circuit elements other than the PbS cell. A casing 38 may be fitted around the frame member which together with the removable end plate 39 completely encloses the oscillatory reflector means and the detector means for protection of the elements therein from stray radiation, dust, moisture, etc.

The shadow image forming means comprises a generally cylindrical barrel 40 which is adapted to be secured within the aperture of the frame (and cover) by a set screw 41. At one end thereof is positioned a source of radiation consisting of a small electrical resistance element 43 supported on insulating member 44. The resistance element by reason of its inverted conical configuration thus transmits radiation, largely in the infrared range, unidirectionally toward the opposite end of the barrel.

A collimating lens 45 is supported in a collar 46 within the path of radiation emanating from the heater 43 to form a collimated beam of radiation. As stated above, this permits movement of the filament parallel to the beam without distorting the image thereof. A slot 47 in the barrel permits a running length of filamentary material to be drawn into the collimated beam to produce a shadow image. A second lens 48 for focusing the beam with the shadow onto the oscillatory reflector means is positioned in collar 49 and is aligned with the heater and collimating lens. Supported within barrel 40, the reference element 50 is suspended between the ends of a support means 51. The support means is preferably a cylindrical bar having an intermediate cut-out section providing a pair of opposed, flat faces between which the reference element is suspended. The cylindrical bar has a terminal portion extending outside the barrel so that the positon of the reference element can be manipulated. In the discussion of the schematic diagrams in FIGURES 1 and 2, the reference element was positioned between the collimating lens and the focusing lens. However, it has been found to be advantageous to place the element as shown in FIGURE 3 within the barrel on the other side of the focusing lens to protect the reference element from dust and moisture and also to facilitate the cleaning of the slot 47 during regular maintenance. The reference element may be either in the form of a wire or a thin flat ribbon 71, shown in FIGURE 5. In the latter case, the width of the shadow image produced thereby may be adjusted by rotating the ribbon in the beam. Obviously, as the ribbon is rotated a greater or lesser extent thereof normal to the axis of the beam is presented therein. Thus as shown in FIGURE 5, variation in shadow width such as W1 and W2 may be obtained. After adjustment, a set-screw (not shown) may be used to fix the reference element in position.

The oscillatory reflector means 31 (FIGURE 3) comprises a reflector element which may be in the form of a silvered mirror 52 mounted on a generally S-shaped armature bar 53. Armature bar 53 is supported on a torsion wire 54 suspended between a pair of stationary disc 55 for oscillating movement about its axis. At one end of the armature bar there is mounted a pair of opposed pole permanent magnets 56, 56. These may be mounted north to north or south to south, the opposed arrangement providing a rapid response to field reversals. A counter weight 57 is attached to the other end of the armature bar to balance the weight of the permanent magnets.

The end of the armature bar having the permanent magnets is positioned in the gap 58 in core element 59 which is preferably laminated. Coil 60 is connected to an A.C. power source which of course causes the field across the gap to reverse itself in a regular cyclical manner thus oscillating the mirror at the same frequency. The frequency at which the mirror is driven is a matter of choice but is preferably between 10–60 c.p.s.; it should not be driven at the natural frequency of the torsion wire. Suitable adjusting means in the form of an adjusting screw 61 are provided for precisely positioning the armature bar and mirror assembly.

The detector means, comprising the PbS cell and the bridge circuit are mounted in the base of the frame member. The PbS cell 62 is preferably mounted on a member 63, slidable relative to the base 34, the position of which may be adjusted by screw means 64. The bridge circuit 65, shown schematically in FIGURE 3, is enclosed within the housing formed by the frame and is connected to the cell by electrical conductors (shown only in part).

*Adjustment of the system*

The inspection apparatus has several points of adjustment to minimize error. Initially the filamentary material is drawn into the beam, the material being supported for reduction of vibration, and the detector cell is positioned by the adjustment screw 64 so that when the mirror is at its zero-point, the filament shadow image falls just on the edge of the sensitized area of the PbS cell. The width of the reference shadow image is then adjusted by rotation of the ribbon in the beam so that said width is approximately identical to the filament shadow image. Coil 60 is then energized, throwing the shadow images of the filament and the reference element respectively alternately on and off the cell. The bridge circuit can then be adjusted to null thus fixing the output of the circuit as a function of the variation from the predetermined ratio of shadow widths. In other words, if the diameter of the filament varies, the ratio of shadow image widths will change causing an A.C. output of the bridge circuit in direct proportion thereto. If the phase relation is known, it is possible to determine whether the filament diameter is larger or smaller than the reference wire.

An alternative form of the detector cell may be employed to increase the ease of adjustment of the system; as shown in FIGURE 4, the detector cell 65 is provided with opaque means 66, 66 for masking the corners of the sensitized area of the cell to provide a generally triangular shaped photosensitive area. By this arrangement, a greater control may be had over the width covered by the shadows since the area covered by a moving shadow will be directly proportional to the distance inward from each corner of the base of the triangle.

Having thus described the inspection apparatus constituting the subject of the present invention, many variations and modifications should be apparent to persons skilled in the art; and while the invention has been disclosed in connection with a specific embodiment thereof, it is to be expressly understood that this was by way of example rather than limitation, and it is intended that the invention be defined by the appended claims which should be given a scope as broad as consistent with the prior art.

What is claimed is:

1. A filamentary material inspection apparatus comprising a housing having a first wall and a base, a generally cylindrical barrel extending through said first wall into said housing, a heater adjacent one terminal portion of said barrel directing a beam of radiation into said housing; means in said barrel defining a slot for receiving a running length of filamentary material thereby forming a shadow image of said material; reference element means in said barrel forming a shadow image of said element generally parallel to and spaced from said filamentary material shadow image; detector means adjacent the base of said housing comprising an electrical bridge circuit including a photosensitive cell, said bridge circuit having a variable output dependent on the quantity of radiation impinging on said photosensitive cell; and oscillating reflector means in said housing in line with the beam of radiation adapted to alternately project the respective shadow images on and off opposed peripheral portions of said cell, whereby the output of said detector means is a function of the difference between the filamentary material diameter and the reference element diameter.

2. Apparatus for comparing a given dimension of a given element with a related dimension of a reference element, which reference element has different length and width dimensions, comprising:

means for simultanously forming shadow images of at least a portion of said given element and said reference element at spaced apart locations;
a support element affixed to said reference element such that adjustment of the position of said support element effects a corresponding movement of the reference element and a related change in the extent of the shadow image of the reference element;
energy conversion means having a preassigned area operative to provide an electrical output signal having at least one characteristic related to the extent of said area on which radiation is incident; and
means for cyclically directing the shadow image of said given element toward a first portion of said preassigned area and cyclically directing the shadow image of said reference element toward a different portion of said preassigned area, the extent of said first portion covered by the shadow image of said given element being equal to the extent of said different portion covered by the shadow image of said reference element only when said given and related dimensions are equal, said characteristic of the output signal varying as a function of the inequality between said given and related dimensions.

References Cited by the Examiner
UNITED STATES PATENTS

| | | | |
|---|---|---|---|
| 2,489,221 | 11/1949 | Herbold | 250—211 X |
| 2,548,755 | 4/1951 | Vossberg et al. | 250—219 |
| 2,699,701 | 1/1955 | Strother et al. | 250—219 |
| 2,841,048 | 7/1958 | Ducan et al. | 250—219 |
| 2,879,405 | 3/1959 | Pankove | 250—211 |
| 2,895,373 | 7/1959 | Eyraud | 250—219 |
| 2,896,086 | 7/1959 | Wunderman | 250—211 |
| 3,017,801 | 1/1962 | Ingber | 250—219 |
| 3,027,457 | 3/1962 | Mouly | 250—219 |
| 3,141,057 | 7/1964 | Acton | 250—219 |

RALPH G. NILSON, *Primary Examiner.*
ARCHIE BORCHELT, *Examiner.*